United States Patent [19]

Ji et al.

[11] Patent Number: 5,796,538

[45] Date of Patent: Aug. 18, 1998

[54] MULTI-DECK VIDEO CASSETTE RECORDER SYSTEM

[75] Inventors: Byung-Lee Ji; Ki-Ha Kwon; Yong-Won Sim, all of Seoul, Rep. of Korea

[73] Assignee: Daewoo Electronics Co., Ltd., Seoul, Rep. of Korea

[21] Appl. No.: 580,236

[22] Filed: Dec. 28, 1995

Related U.S. Application Data

[63] Continuation-in-part of Ser. No. 175,301, Dec. 29, 1993, abandoned, which is a continuation-in-part of Ser. No. 743,896, Aug. 12, 1991, abandoned.

[30] Foreign Application Priority Data

| Nov. 12, 1990 | [KR] | Rep. of Korea | 90-18258 |
| Jan. 18, 1991 | [KR] | Rep. of Korea | 91-717 |
| Jun. 25, 1991 | [KR] | Rep. of Korea | 91-10554 |

[51] Int. Cl.[6] ............................................. G11B 15/16
[52] U.S. Cl. .......................... 360/71; 360/15; 360/92; 360/69; 360/62; 360/61; 369/84
[58] Field of Search ............................. 360/15, 92, 69, 360/71, 74.1, 62, 61; 369/34, 35, 84; 395/154, 404, 806, 508, 510

[56] References Cited

U.S. PATENT DOCUMENTS

| 4,262,314 | 4/1981 | Smith | 360/92 X |
| 4,309,729 | 1/1982 | Kice | 360/69 X |
| 4,768,110 | 8/1988 | Dunlap | 360/15 X |
| 4,851,937 | 7/1989 | Sander | 360/69 |
| 5,025,324 | 6/1991 | Hashimoto | 369/84 X |
| 5,055,937 | 10/1991 | Yamada | 386/64 |
| 5,124,807 | 6/1992 | Dunlap | 360/15 X |
| 5,239,420 | 8/1993 | Choi | 360/15 |
| 5,327,296 | 7/1994 | Nagasawa | 360/15 |
| 5,426,534 | 6/1995 | Nakata | 360/15 |

Primary Examiner—Aristotelis M. Psitos
Assistant Examiner—Alan Faber
Attorney, Agent, or Firm—Pennie & Edmonds LLP

[57] ABSTRACT

An improved multi-deck VCR system for performing a combination operation and a series playback operation comprises at least three VCR units, a remote control unit for selecting one of a variety operating modes to drive the VCR units in accordance with a selected operation mode, a combination of a first switch and a mode conversion circuit for effecting the combination operation wherein a particular one of the VCR units operates in a playback mode and the remaining VCR units are simultaneously driven in a recording mode and a combination of a second switch and a sequential logic circuit for effecting the series playback operation wherein each of the VCR units is sequentially and repeatedly driven in the playback mode.

8 Claims, 5 Drawing Sheets

MULTI-DECK VIDEO CASSETTE RECORDER SYSTEM

CROSS-REFERENCE TO THE RELATED APPLICATIONS

This application is a continuation-in-part of U.S. Ser. No. 08/175,301 filed on Dec. 29, 1993 now abandoned, which is a continuation-in-part of U.S. Ser. No. 07/743,896 filed on Aug. 12, 1991, now abandoned.

FIELD OF THE INVENTION

The present invention relates to a multiple deck video cassette recorder (hereinafter referred to as a multi-deck VCR) system employing a plurality of VCR decks; and, more particularly, to an improved multi-deck VCR system capable of performing a combination and a series of playback operations.

BACKGROUND OF THE INVENTION

To overcome the limitations inherent in a conventional single-deck VCR, e.g., the need to employ another such VCR in order to duplicate a video program recorded on a videotape, there has been proposed a number of multi-deck VCR systems provided with two or more decks therein. For instance, there is disclosed in U.S. Pat. No. 4,768,110 a dual-deck VCR system which is capable of simultaneously recording an external signal onto a pair of blank video tapes loaded in two VCR decks provided therein or duplicating a program from a source tape in one VCR deck onto a target tape in the other VCR deck. However, such a dual-deck VCR system still has a drawback in that the duplication is accomplished through a series of complicated operations: for the VCR decks are structured to be independently operated by two separate sets of function buttons. Further, the prior art double-deck VCR systems are not adequately equipped to carry out mass reproduction of a video program.

In addition, there has been no VCR system capable of playing, without interruption, a plurality of video cassette tapes in series or in repetition.

SUMMARY OF THE INVENTION

Accordingly, it is an object of the present invention to provide an improved multi-deck VCR system capable of performing a continuous playback operation of a plurality of video tapes loaded therein.

Another object of the present invention is to provide an improved multi-deck VCR system, having at least three VCR units, capable of carrying out a "combination operation", wherein one of the VCR units performs a playback operation while the remaining VCR units operate in a recording mode.

It is a further object of the instant invention to provide an improved multi-deck VCR system adapted for use in the mass reproduction or recording of a video program on a large number of video tapes.

In accordance with the present invention, there is provided an improved multi-deck VCR system having at least three VCR units within a single housing, each VCR unit having a control means to drive said each VCR unit in accordance with a selected operation mode, which comprises:

a remote control unit for selecting one of a variety of operation modes including a playback mode and a recording mode and providing a mode signal voltage indicative of the selected operation mode;

an analog-to-digital ("A/D") converter for converting the mode signal voltage into an operation mode signal and providing the operation mode signal to each of the control means so as to simultaneously operate each of the VCR units in the selected operation mode, wherein the operation mode signal has a set of binary codes with a predetermined code arrangement in parallel;

a first user-controlled switch for triggering a combination operation pursuant to the recording mode selected by the remote control unit, wherein a particular one of the VCR units operates in the playback mode and the remaining VCR units operate in the recording mode simultaneously;

means, interfaced with the particular VCR unit, and in response to a combination operation selection signal generated by the first user-controlled switch, for changing a code arrangement of a recording mode signal provided from the A/D converter to generate a quasi playback mode signal having a code arrangement identical to that of a playback mode signal, the quasi playback mode signal being supplied to the control means in the particular VCR unit and the recording mode signal being directly supplied to each of the control means in the remaining VCR units;

a second user-controlled switch for triggering a series playback operation pursuant the playback mode selected by the remote control unit, wherein each of the VCR units is sequentially and repeatedly driven in the playback mode; and means for sequentially and repeatedly providing a playback start signal to each of the control means in a predetermined order so as to cause said each of the control means to operate its corresponding VCR unit in the playback mode during the duration of the series playback operation triggered by the second user-controlled switch.

BRIEF DESCRIPTION OF THE DRAWINGS

The above and other objects and features of the present invention will become apparent from the following description of preferred embodiments with reference to the accompanying drawings, in which.

DETAILED DESCRIPTION OF THE PREFERRED EMBODIMENTS

Figure 1:
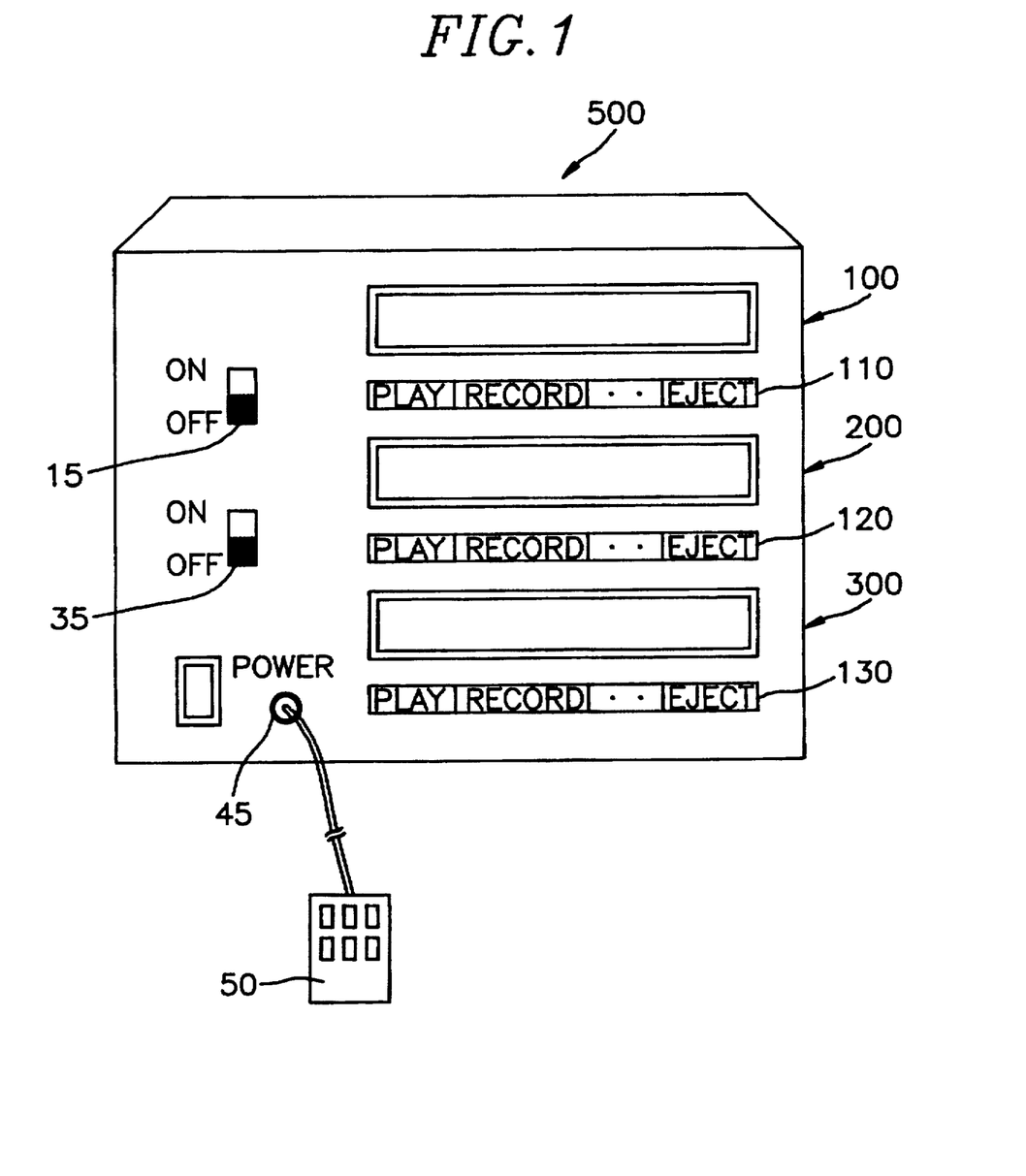
FIG. 1 shows a front view of the housing and panel of the inventive multi-deck VCR system.

Referring now to the drawings and particularly to FIG. 1, the present multi-deck VCR system, as a preferred embodiment, is contained within a single housing 500 and comprises a triple VCR unit arrangement consisting of three VCR units 100, 200 and 300, a panel having a combined operation selection switch 15, a series playback selection switch 35 and a remote control unit 50 which is functionally linked to the multi-deck VCR system through a remote connection jack 45. Further, the respective VCR units 100, 200 and 300 are shown to have operation button boxes 110, 120 and 130, including PLAY, RECORD, FF(fast forward), REW (rewind), STOP and EJECT, respectively, for selecting an operation mode thereof. Accordingly, the respective VCR units are able to operate indenpendently of each other in their respective selected mode.

Figure 2:
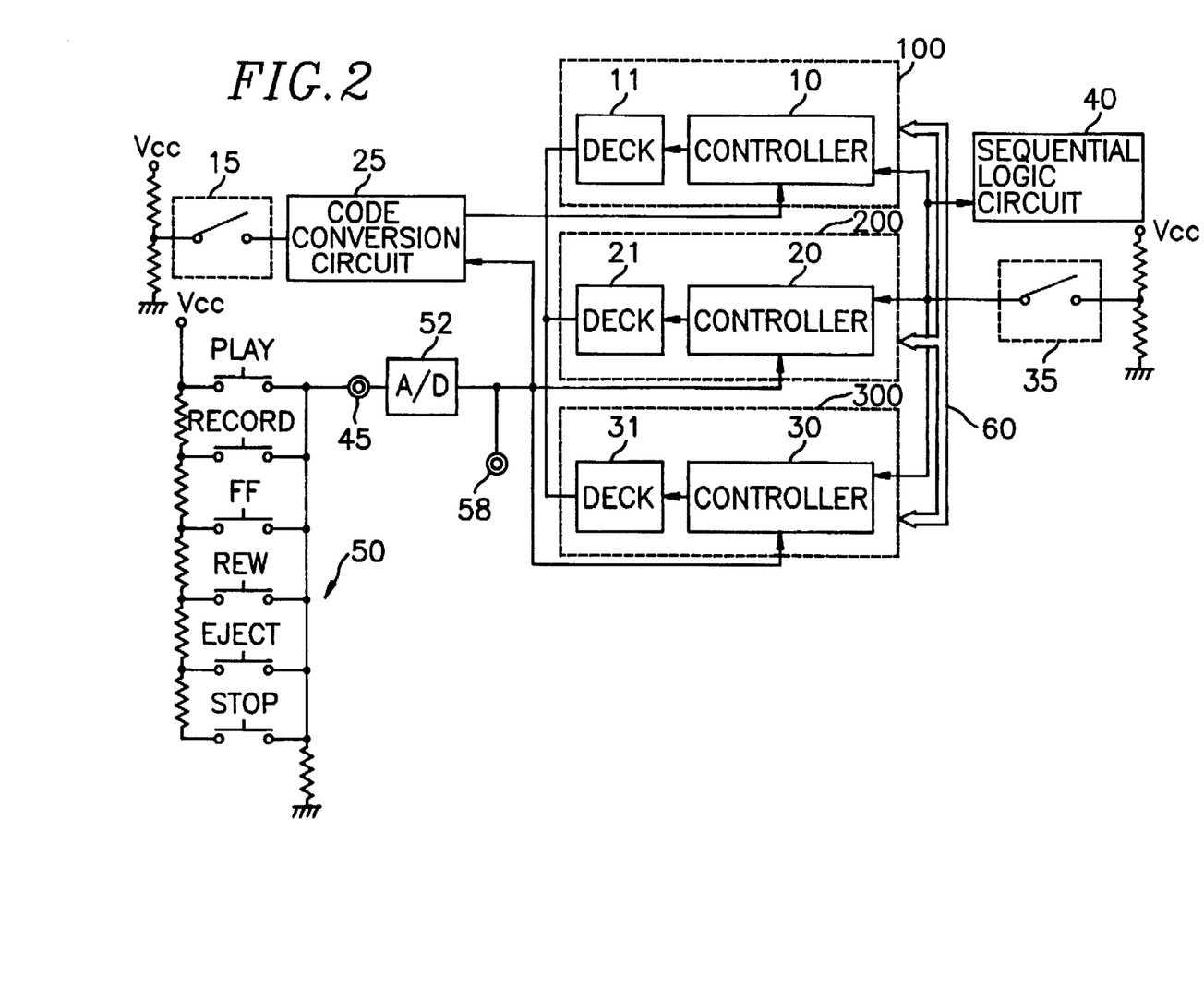
FIG. 2 illustrates a schematic block diagram of the multi-deck VCR system shown in FIG. 1.

As best shown in FIG. 2, the VCR units 100, 200 and 300 comprise decks designated as reference numerals 11, 21 and 31 and controllers designated as reference numerals 10, 20 and 30 for controlling the operation of the decks 11, 21 and 31, respectively. Although it is not specifically described or shown herein, it should be understood that each of the VCR units comprises electrical and mechanical components, as well known in the art, which are designed to record input information onto a video tape loaded therein as well as to play out recorded data or program therefrom under the control of the relevant controller. Each of the controllers 10, 20 and 30 may be a CPU (central processing unit) or a microprocessor which controls the various functions and operating modes of its associated VCR unit.

The remote control unit 50 has a plurality of function buttons such as PLAY, RECORD, FF, REW, STOP, EJECT and the like thereon which are essentially the same as those on the operation button boxes 110, 120 and 130 for selecting a variety of operation modes of the VCR units 100, 200 and 300. In accordance with the invention, the remote control unit 50 is equipped with a multi-stage voltage divider which interprets the operation mode selected by each of the buttons thereon to generate a voltage signal corresponding to the selected mode. The voltage signal produced in the remote control unit 50 is provided to an analog-to-digital ("A/D") converter 52. The A/D converter 52 is adapted to convert the voltage signal into an operation mode signal having a predetermined number of binary codes representing the selected mode. The operation mode signal converted by the A/D converter 52 is applied to each of the VCR units: more specifically, to each of the controllers 10, 20 and 30 simultaneously. In response to the operation mode signal, the controllers 10, 20 and 30 respectively control the VCR units 110, 120 and 130 to perform the selected mode defined by the operation mode signal.

An output jack 58, which is installed on a rear side of the multi-deck VCR system, may be coupled to a connection jack of another multi-deck VCR system, thereby constructing a chain of multi-deck VCR systems. With this arrangement, in case, e.g., a recording mode signal is provided from the multi-deck VCR system 500 to another multi-deck VCR system, all of the VCR units in the chain of VCR systems can be dedicated to operating in a recording mode, to thereby attain the capability of a mass reproduction of a video program.

The first VCR unit 100 is interfaced with a code conversion circuit 25 through which the operation mode signal derived from the remote control unit 50 is applied to the first controller 10 while the remaining VCR units 200 and 300 are connected to directly receive the operation mode signal from the remote control unit 50 through the controllers 20 and 30. Connected to the code conversion circuit 25 is the combined operation selection switch 15. The cooperation of the code conversion circuit 25 and the combined operation selection switch 15 enables the multi-deck VCR system to perform a combination operation in accordance with the present invention.

The term "combination operation" as used herein means a multiple number of operations taking place simultaneously in the multi-deck VCR system wherein a particular one of the VCR units, e.g., the first VCR unit 100, interfaced with the code conversion circuit 25 operates in a playback mode while the remaining VCR units, i.e., the second and the third VCR units 200 and 300, operate in a recording mode, simultaneously. The combination operation is particularly useful in a tape-to-tape(s) reproduction operation, e.g., by using the video cassette tape loaded in the first VCR unit 100 as a source tape and one or both video cassette tapes loaded in one or two of the remaining VCR units 200, 300 as a target tape(s).

In carrying out the combination operation, if the user turns on the combined operation selection switch 15 in order to trigger the combination operation and then presses the RECORD button on the remote control unit 50 or vice versa, the code conversion circuit 25 converts a recording mode signal supplied thereto via the A/D converter 52 into a playback operation mode signal so as to drive the first VCR unit 100 to operate in the playback mode. Consequently, video and audio information reproduced from the source tape loaded in the first VCR unit 100 is fed to each of the target tapes loaded in the second and the third VCR units 200 and 300 through a signal transmission path 60.

With continued reference to FIG. 2, connected to the controllers 10, 20 and 30 in the VCR units 100, 200 and 300 are the series playback selection switch 35 and a sequential logic circuit 40, respectively. The combination of the series playback selection switch 35 and the sequential logic circuit 40 enables the multi-deck VCR to perform a series playback operation.

The term "series playback operation" as used herein means a continuous playback operation of the multi-deck VCR system, wherein each of the VCR units is made to sequentially and repeatedly operate in the playback mode. This function satisfies the long-felt need to have a VCR equipment which allows the viewing of a long series of video programs or different video programs in series without having to interrupt the operation of the VCR for replacing/reloading the video tapes.

In concert with each of the controllers 10, 20 and 30, the sequential logic circuit 40 serves to establish a series playback sequence for each VCR unit so that the VCR units may consecutively operate in the playback mode under the control of the respective controllers.

In carrying out the series playback operation, if the user turns on the series playback selection switch 35 in order to trigger the series playback operation and then presses the PLAY button on the remote control unit 50 or vice versa, the controllers 10, 20 and 30 will stop all operations being executed so as to make the system ready to execute the series playback operation and in turn to allow each of the VCR units to play out the cassette tape in accordance with the playback sequence established by the sequential logic circuit 40.

Figure 3:
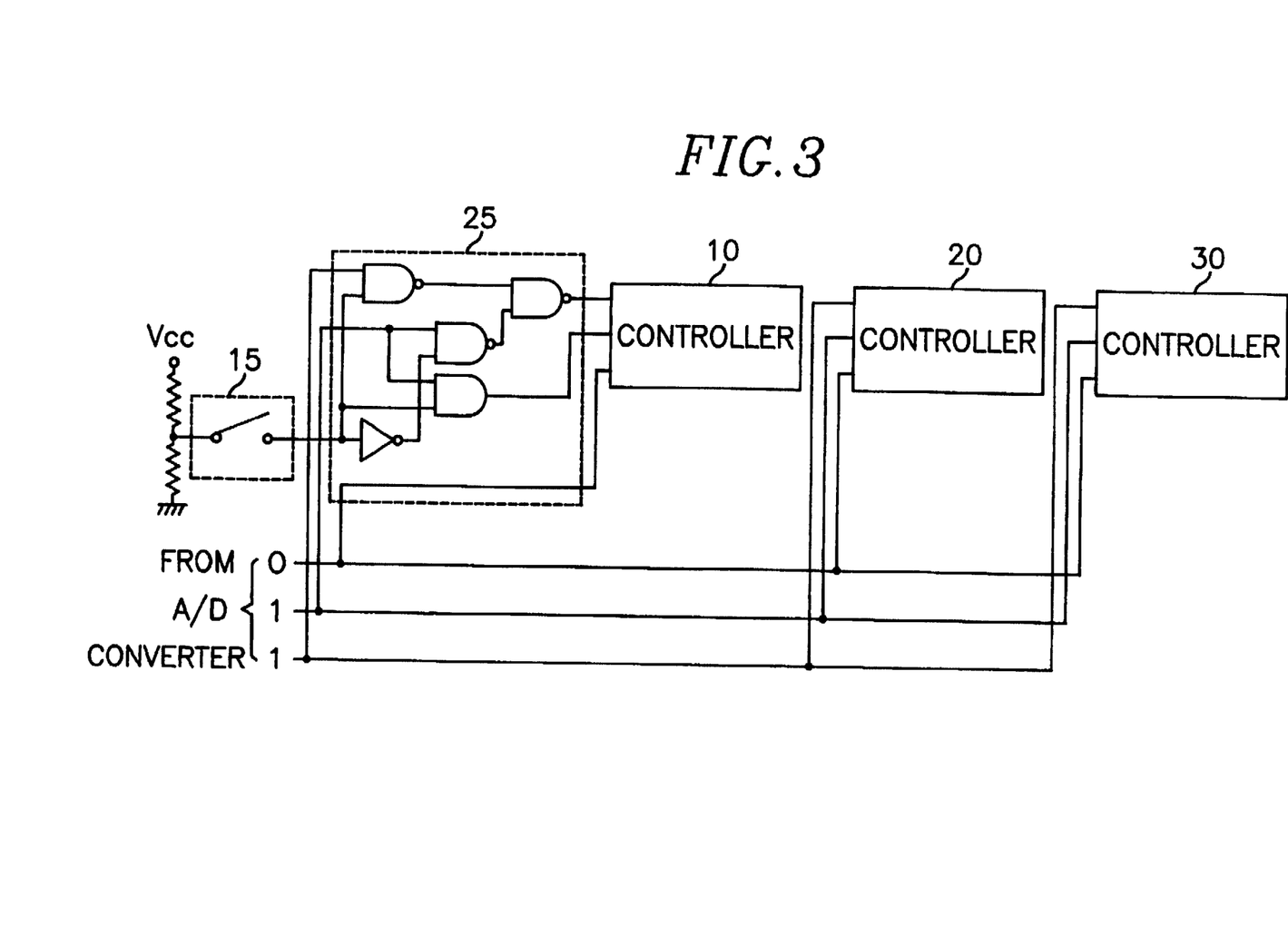
FIG. 3 represents a logic diagram of the mode conversion circuit shown in FIG. 2.

Turning now to FIG. 3, there is shown how the respective VCR units are put in the combination operation; and, particularly, how the code conversion circuit 25 operates to provide the playback mode signal to the first VCR unit 100.

The code conversion circuit 25 consists of a plurality of logic elements adapted to convert the recording mode signal with a predetermined code arrangement into a quasi playback mode signal whose code arrangement is identical to that of the playback mode signal by logically combining the recording mode signal from the remote control unit 50 and a combination operation signal indicative of the combined operation selection switch 15 placed in an activated state.

By way of illustration, assuming that the recording mode signal is represented as a code arrangement "110" in parallel and the playback mode signal is represented as a code arrangement "100" in parallel, as shown in FIG. 3, when the recording mode signal passes through the code conversion circuit 25 with the combination operation selection signal, the code arrangement of the recording mode signal is changed from "110" to "100", which is identical to the code arrangement of the playback mode signal. As a result, the controller 10 in the first VCR unit 110 receives the quasi playback mode signal "100" to cause its corresponding deck 11 to drive in the playback mode. However, since the second and the third VCR units 200 and 300 are not interfaced with the code conversion circuit 25, the recording mode signal from the remote control unit 50 will be applied directly to the controllers 20 and 30 in the second and the third VCR units 200 and 300 to cause their corresponding decks 21 and 31 to operate in the recording mode, respectively, thereby enabling the multi-deck VCR system to perform the combination operation. On the other hand, in accordance with the present invention, when the combined operation selection switch 15 is turned off, even if all the other operation mode signals including the recording mode signal are supplied from the remote control unit 50 to the code conversion circuit 25, the operation mode signals or their code arrangements will remain unchanged.

Accordingly, the information signal reproduced from the source tape can be fed to the target tapes loaded in the second and the third VCR units 200 and 300 via the signal transmission path 60. It will be apparent to those skilled in the art that the combination operation of the present invention may be implemented with a software, e.g., by programming each of the controllers, without involving the code conversion circuit 25.

Figure 4:
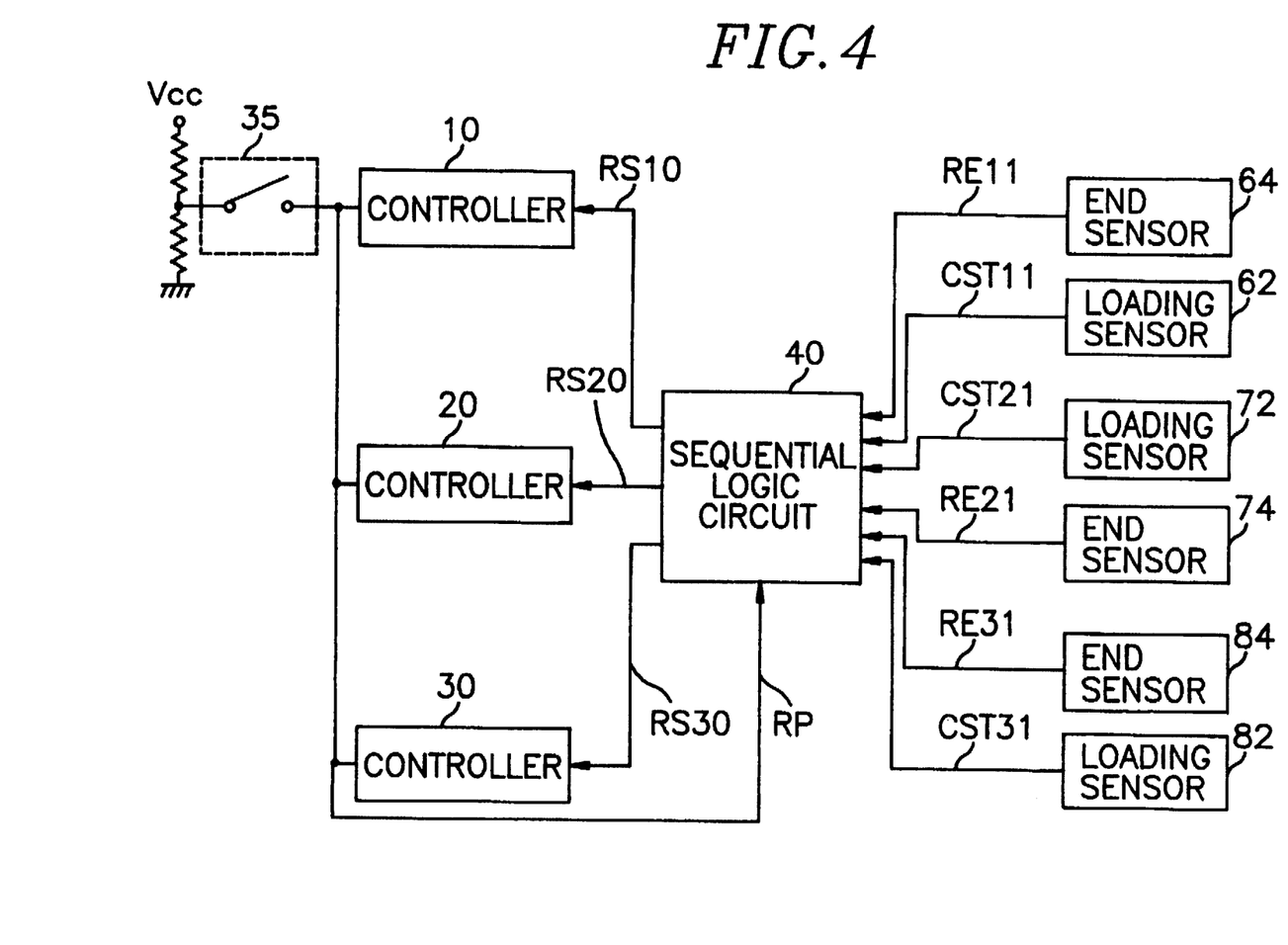
FIG. 4 depicts a block diagram illustrating the continuous playback operation of the multi-deck VCR system in accordance with the invention.

The series playback operation of the present invention will now be described with reference to FIG. 4 which illustrates a network construction for performing the series playback operation. In the drawing, reference numerals 62, 72 and 82 represent cassette loading sensors, respectively; and reference numerals 64, 74 and 84 indicate end sensors, respectively. Each of the cassette loading sensors 62, 72 and 82 serves to detect whether or not a tape cassette is loaded in each of the VCR decks 11 21 and 31. When the cassette loading sensor detects the tape cassette loaded in the VCR deck, it generate a cassette detection signal CST indicative of the presence of the tape cassette.

Each of the end sensors 64, 74 and 84 functions to sense the completion of the playback operation of each of the VCR decks 11, 21 and 31. When the end sensor senses the end run of a tape, it generates a playback completion signal RE representing the completion of the playback operation of the VCR deck.

The sequential logic circuit 40 receives the signals CST, and RE derived from each of the cassette loading sensors and the end sensors and a series playback selection signal RS generated when the series playback selection switch 15 is turned on, and selectively provides a signal RS to the controllers 10, 20 and 30. The signal RS is used as a series playback start signal to cause a controller provided with the signal RS to drive its corresponding deck in the playback mode.

In this connection, it should be noted that a first set of reference numerals such as 11, 21 and 31 attached to each of the signals is used to identify the signal sources which produce the referenced signals; and a second set of reference numerals such as 10, 20 and 30 is used to identify the controllers which receive the referenced signals.

Basically, the series playback sequence is designated in a predetermined order, e.g., in the order of the first VCR unit 100, the second VCR unit 200 and the third VCR unit 300. However, in accordance with the invention, a part of the series playback sequence can be skipped in case, e.g., when no tape cassette is loaded in one of the VCR units. Further, the series playback sequence may be repeated in the predetermined order whenever the multi-deck VCR system completes each cycle of its playback operation.

Figure 5A:
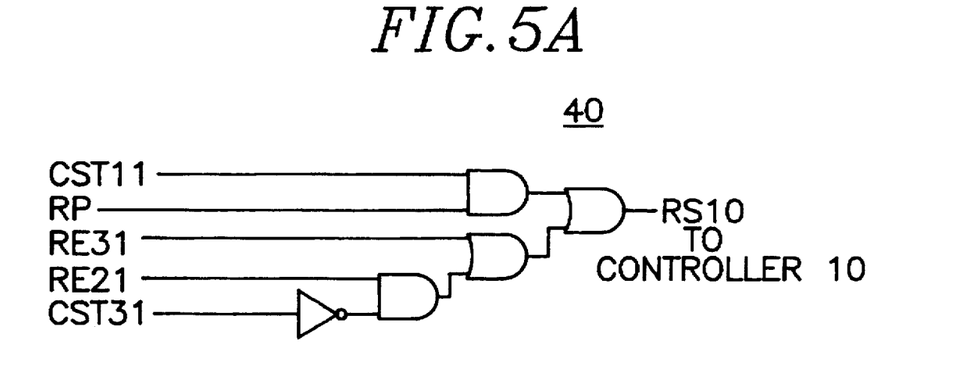
FIGS. 5A, 5B and 5C present logic diagrams for the sequential logic circuit shown in FIG. 4.
Figure 5B:
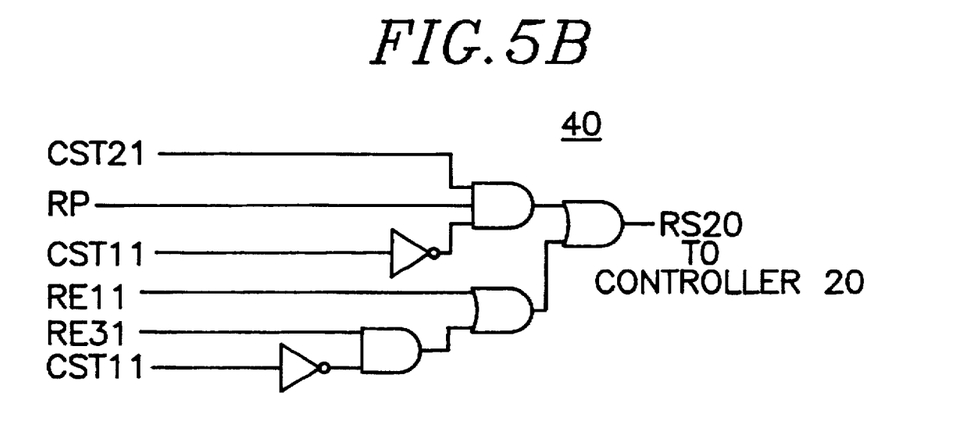
Figure 5C:
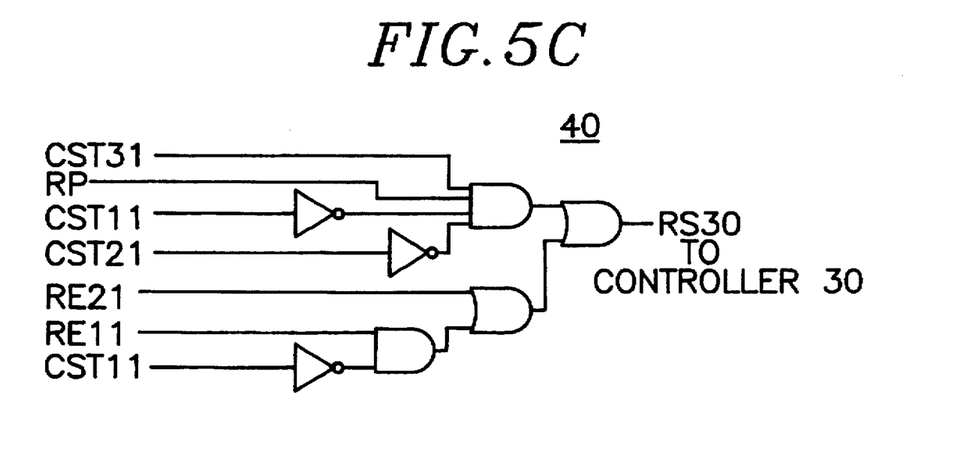

FIGS. 5A, 5B and 5C illustrate the logic diagrams of the sequential logic circuit 40 for designating the playback operation sequence of the VCR units 100, 200 and 300, respectively.

The sequential logic circuit 40 comprises a plurality of logic elements which are divided into, e.g., three parts, as shown in FIGS. 5A, 5B and 5C for determining the playback operation sequence of the VCR units 100, 200 and 300, respectively.

As shown in FIG. 5A, the first VCR deck 11 enters the playback operation when: a tape cassette is loaded therein at present (as represented by "CST11" shown at the head of the first line in FIG. 5A) and the series playback selection signal is applied thereto (as represented by "RP" shown at the head of the second line of FIG. 5A); and the third VCR deck 31 has completed its playback operation (as represented by "RE31") or the second VCR deck 21 has completed its playback operation ("RE21") with the third VCR deck 31 devoid of a tape cassette therein (as represented by "CST31" passing through an inverter shown at the head of the fifth line in FIG. 5A).

As shown in FIG. 5B, the second VCR deck 21 enters the playback operation when: the tape cassette is loaded therein at present ("CST21"), the series playback selection signal is applied thereto ("RP") and the tape cassette is not loaded in the first VCR deck 11 ("CST11"); and the first VCR deck 11 has completed its playback operation ("RE11") or the third VCR deck 31 has completed its playback operation ("RE31") with the first VCR deck 11 devoid of a tape cassette therein ("CST11").

Similarly, as shown in FIG. 5C, the third VCR deck 31 enters the playback operation when: a tape cassette is loaded therein at present ("CST31"), the series playback selection signal is applied thereto ("RP") and no tape cassettes are loaded in the first VCR deck 11 and the second VCR deck 21 respectively; and the second VCR deck 21 has completed its playback operation or the first VCR deck 11 has completed its playback operation and no video cassette tape is loaded in the second VCR deck 21.

The specific process of designating the initial operation for each of the VCR units will now be described hereinbelow.

When the series playback selection switch 35 and the PLAY button are turned on, the sequential logic circuit 40 provides a signal RS10 to the controller 10 in the first VCR unit 100. However, if it is detected by the cassette loading sensor 62 that there is no cassette tape loaded in the first VCR deck 11, the sequential logic circuit 40 instead provides a signal RS20 to the controller 20 in the second VCR unit 200 in order to relay the playback operation to the second VCR unit; and so on. Should one of the VCR units be operated in the playback mode, the sequential logic circuit 40 will not produce the signal RS10, RS20 or RS30 at all.

When the end sensor 64 determines the completion of the playback operation of the first VCR deck 11, it feeds a signal RE11 to the sequential logic circuit 40. Subsequently, the sequential logic circuit 40 provides a signal RS20 to the controller 20 in the second VCR unit 200 so that the second VCR deck 21 can perform the playback operation. If the cassette loading sensor 72 determines that the second VCR deck 21 does not have any cassette tape loaded therein, it should be determined whether the third VCR unit 300 is ready to operate.

Similarly, when it is detected that the playback operation in the second VCR deck 21 comes to an end, the end sensor 74 produces a signal RE21 to the sequential logic circuit 40, which in turn provides a signal RS30 to the controller 30 in the third VCR unit 300.

If it is determined that the third VCR deck 31 has completed its playback operation by the end sensor 84 or it does not have any cassette tape loaded therein as detected by the cassette loading sensor 82, the operation sequence returns to the first VCR deck 11. These steps are repeated until the series playback selection switch 35 is turned off.

The series playback operation may also be implemented with a software, e.g., by programming each of the controllers; and it may be possible to automatically perform the REW mode whenever each of the VCR units completes its playback operation and also to exchange the rewound tapes by using the EJECT buttons present on the respective VCR units through the use of each of the programmed controllers.

While the present invention has been shown and described with respect to the preferred embodiments, it will be apparent to those skilled in the art that many changes and modifications may be made without departing from the spirit and scope of the invention as defined in the appended claims.

What is claimed is:

1. A multi-deck video cassette recorder ("VCR") system having at least three VCR units and a corresponding number of controllers, each controller driving a corresponding VCR unit in a selected one of a plurality of operation modes including at least a recording mode and a playback mode, said system comprising:

a remote control unit for selecting one of said recording mode and playback mode and then generating a recording mode voltage signal if the recording mode is selected and a playback mode voltage signal if the playback mode is selected;

an analog-to-digital ("A/D") converter for providing either one of a recording mode signal and a playback mode signal by converting said recording mode voltage signal into the recording mode signal if the recording mode voltage signal is inputted thereto from the remote control unit, and converting the playback mode voltage signal into the playback mode signal if the playback mode voltage signal is inputted thereto from the remote control unit;

a first user-controlled switch for generating a combination operation selection signal in response to the recording mode signal from the A/D converter;

means, in response to the combination operation selection signal, for changing the code arrangement of the recording mode signal to thereby provide a quasi playback mode signal having a set of binary codes with a predetermined code arrangement identical to that of the playback mode signal, wherein the playback mode signal causes a predetermined one of the VCR units to be driven in the playback mode and the recording mode signal causes the remaining VCR units to be driven in the recording mode simultaneously;

a second user-controlled switch for generating a series playback operation selection signal in response to the playback mode signal from the A/D converter; and means, in response to the series playback operation selection signal, for sequentially and repeatedly providing a playback start signal to the controllers in a predetermined order such that a series playback operation of the VCR units is effected, each controller driving a corresponding VCR unit in the playback mode when the playback start signal is transmitted thereto, wherein said means for sequentially and repeatedly providing the playback start signal includes:

sensing means for detecting the completion of the playback operation of a VCR unit to produce a playback completion detection signal;

means for generating the playback start signal in response to the playback completion detection signal;

detecting means for detecting and generating a detection signal in case there is no tape cassette is loaded in the corresponding VCR unit; and means for relaying the playback start signal to a control means of a next VCR unit in the predetermined order in response to the detection signal.

2. In a multi-deck video cassette recorder ("VCR") system including at least three VCR units and a corresponding number of controllers, each controller driving a corresponding VCR unit in a selected one of operation modes including a recording mode and a playback mode:

a remote control unit for selecting one of a recording mode and a playback mode from among a plurality of operation modes, and then generating a recording mode voltage signal if the recording mode is selected and a playback mode voltage signal if the playback mode is selected;

an analogue-to-digital ("A/D") converter for providing one of a recording mode signal and a playback mode signal by converting the recording mode voltage signal into the recording mode signal if the recording mode voltage signal is inputted thereto from the remote control unit, and converting the playback mode voltage signal into the playback mode signal if the playback mode voltage signal is inputted thereto from the remote control unit; and an apparatus for performing a series playback operation wherein each of the VCR units is sequentially and repeatedly driven in the playback mode selected by the remote control unit, the improvement wherein the apparatus comprises:

a user-controlled switch for generating a series playback operation selection signal in response to the playback mode signal from the A/D converter; and means, in response to the series playback operation selection signal, for sequentially and repeatedly providing a playback start signal to the controllers in a predetermined order such that a series playback operation of the VCR units is effected, each controller driving a corresponding VCR unit in the playback mode when the playback start signal is transmitted thereto, wherein said means for sequentially and repeatedly providing the playback start signal includes:

sensing means for detecting the completion of the playback operation of a VCR unit to produce a playback completion detection signal;

means for generating the playback start signal in response to the playback completion detection signal;

detecting means for detecting and generating a detection signal in case there is no tape cassette loaded in the corresponding VCR unit; and means for relaying the playback start signal to a control means of a next VCR unit in the predetermined order in response to the detection signal.

3. A multi-deck video cassette recorder ("VCR") system including at least three VCR units and having a corresponding number of controllers, each controller driving a corresponding VCR unit in a selected one of operation modes including a recording mode and a playback mode, which comprises:

a mode selection signal input device to provide either one of a recording mode signal and a playback mode signal, said mode selection signal input device including:

a remote control unit for selecting either one of a recording mode and a playback mode among a variety of operation modes including a recording mode and a playback mode and then generating a recording mode voltage signal when the recording mode is selected, and a playback mode voltage signal when the playback mode is selected; and an analogue-to-digital ("A/D") converter for converting the recording mode voltage signal into the recording mode signal when the recording mode voltage signal is inputted thereto from the remote control unit and the playback mode voltage signal into the playback mode signal when the playback mode voltage signal is inputted thereto from the remote control unit, thereby providing either one of the recording mode signal and the playback mode signal, conversion means for converting the recording mode signal into a quasi playback mode signal, said conversion means including:

a first user-controlled switch for generating a combination operation selection signal in response to the recording mode signal from the A/D converter; and means, in response to the combination operation selection signal, for changing the code arrangement of the recording mode signal to thereby provide the quasi playback mode signal;

a second user-controlled switch for generating a series playback operation selection signal in response to the playback mode signal from the A/D converter; and means, in response to the series playback operation selection signal, for sequentially and repeatedly providing a playback start signal to the controllers in a predetermined order while performing the series playback operation of the VCR units, wherein each controller drives a corresponding VCR unit in the playback mode when the playback start signal is transmitted thereto, wherein the quasi playback mode signal is inputted to a predetermined one of the VCR units and the recording mode signal is inputted to the remaining VCR units at the same time, wherein the quasi playback mode signal makes the predetermined one of the VCR units to be driven in the playback mode and the recording mode signal makes the remaining VCR units to be driven in the recording mode, respectively, and the quasi playback mode signal has a set of binary codes with a predetermined code arrangement identical to that of the playback mode signal, and said means for sequentially and repeatedly providing the playback start signal includes:

sensing means for detecting the completion of the playback operation of a VCR unit to produce a playback completion detection signal;

means for generating the playback start signal in response to the playback completion detection signal;

detecting means for detecting and generating a detection signal in case there is no tape cassette loaded in the VCR unit; and means for relaying the playback start signal to a control means of a next VCR unit in the predetermined order in response to the detection signal.

4. A multi-deck video cassette recorder ("VCR") system including at least three VCR units, each VCR unit having a corresponding controller, each controller driving a corresponding VCR unit in a selected one of operation modes including a recording mode and a playback mode, which comprises:

a mode selection signal input device to provide either one of a recording mode signal and a playback mode signal, said mode selection signal input device including:

a remote control unit for selecting either one of a recording mode and a playback mode among a variety of operation modes including a recording mode and a playback mode and then generating a recording mode voltage signal when the recording mode is selected and a playback mode voltage signal when the playback mode is selected, and an analogue-to-digital ("A/D") converter for converting the recording mode voltage signal into the recording mode signal when the recording mode voltage signal is generated from the remote control unit and the playback mode voltage signal into the playback mode signal when the playback mode voltage signal is generated from the remote control unit, thereby providing either one of the recording mode signal and the playback mode signal;

a user-controlled switch for generating a series playback operation selection signal in response to the playback mode signal, and means, in response to the series playback operation selection signal, for generating a playback start signal and then transmitting the playback start signal to each of the controllers in the VCR units in a predetermined order while performing a series playback operation of the VCR units, wherein the playback start signal makes said each VCR unit to be driven in the playback mode when the playback start signal is inputted to said each VCR unit wherein said means for generating the playback start signal includes:

sensing means for detecting the completion of the playback operation of a VCR unit to produce a playback completion detection signal;

means for generating the playback start signal in response to the playback completion detection signal;

detecting means for detecting and generating a detection signal in case there is no tape cassette loaded in the corresponding VCR unit; and means for relaying the playback start signal to a control means of a next VCR unit in the predetermined order in response to the detection signal.

5. The multi-deck VCR system according to claim 4, wherein the multi-deck VCR system further comprises:

conversion means for converting the recording mode signal into a quasi playback mode signal in response to the recording mode signal to thereby provide the quasi playback mode signal, wherein the quasi playback mode signal makes said each VCR unit to be driven in the playback mode when the quasi playback mode signal is inputted to said each VCR unit.

6. The multi-deck VCR system according to claim 5, wherein the quasi playback mode signal from said conversion means is inputted to a predetermined one of the VCR units and the recording mode signal from said mode selection signal input device is inputted to all of the remaining VCR units, respectively at the same time, wherein the quasi playback mode signal makes the predetermined one of the VCR unit to be driven in the playback mode and the recording mode signal makes the remaining VCR units to be driven in the recording mode, respectively.

7. The multi-deck VCR system according to claim 6, wherein said conversion means includes:

a first user-controlled switch for generating a combination operation selection signal in response to the recording mode signal from the A/D converter; and means, in response to the combination operation selection signal, for changing the code arrangement of the recording mode signal to thereby provide the quasi playback mode signal.

8. A multi-deck video cassette recorder ("VCR") system including at least three VCR units having a corresponding number of controllers, each controller driving a corresponding VCR unit in a selected one of operation modes including a recording mode and a playback mode, which comprises:

a remote control unit for selecting either one of a recording mode and a playback mode among a variety of operation modes including a recording mode and a playback mode and then generating a recording mode voltage signal when the recording mode is selected and a playback mode voltage signal when the playback mode is selected;

an analogue-to-digital ("A/D") converter for converting the recording mode voltage signal into the recording mode signal when the recording mode voltage signal is inputted thereto from the remote control unit and the playback mode voltage signal into the playback mode signal when the playback mode voltage signal is inputted thereto from the remote control unit, thereby providing either one of the recording mode signal and the playback mode signal;

a first user-controlled switch for generating a combination operation selection signal in response to the recording mode signal from the A/D converter;

means, in response to the combination operation selection signal, for changing the code arrangement of the recording mode signal to thereby provide the quasi playback mode signal, wherein the quasi playback mode signal having a set of binary codes with a predetermined code arrangement identical to that of the playback mode signal, wherein the playback mode signal makes a predetermined one of the VCR unit to be driven in the playback mode and the recording mode signal makes the remaining VCR units to be driven in the recording mode simultaneously;

a second user-controlled switch for generating a series playback operation selection signal in response to the playback mode signal from the A/D converter; and means, in response to the series playback operation selection signal, sequentially and repeatedly providing a playback start signal to the controllers in a predetermined order while performing a series playback operation of the VCR units, each controller driving a corresponding VCR unit in the playback mode when the playback start signal is transmitted thereto, wherein said means for sequentially and repeatedly providing the playback start signal further includes:

sensing means for detecting the completion of the playback operation of a VCR unit to produce a playback completion detection signal;

means for generating the playback start signal in response to the playback completion detection signal;

detecting means for detecting and generating a detection signal in case there is no tape cassette loaded in the corresponding VCR unit; and means for relaying the playback start signal to a control means of a next VCR unit in the predetermined order in response to the detection signal.

\* \* \* \* \*